(12) United States Patent
Mestha et al.

(10) Patent No.: US 7,561,133 B2
(45) Date of Patent: Jul. 14, 2009

(54) SYSTEM AND METHODS OF DEVICE INDEPENDENT DISPLAY USING TUNABLE INDIVIDUALLY-ADDRESSABLE FABRY-PEROT MEMBRANES

(75) Inventors: Lalit K. Mestha, Fairport, NY (US); Peter M. Gulvin, Webster, NY (US); Pinyen Lin, Rochester, NY (US); Yao Rong Wang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 652 days.

(21) Appl. No.: 11/319,395

(22) Filed: Dec. 29, 2005

(65) Prior Publication Data

US 2007/0153243 A1    Jul. 5, 2007

(51) Int. Cl.
G09G 3/36    (2006.01)
(52) U.S. Cl. .............................. 345/87; 345/88; 345/89
(58) Field of Classification Search .................... 345/77, 345/84, 85, 86, 87, 108, 109, 88, 89
See application file for complete search history.

(56) References Cited

U.S. PATENT DOCUMENTS

| | | | |
|---|---|---|---|
| 6,295,130 B1 | 9/2001 | Sun et al. | |
| 6,836,366 B1* | 12/2004 | Flanders et al. | 359/578 |
| 6,850,352 B1* | 2/2005 | Childers | 359/237 |
| 6,980,346 B1* | 12/2005 | Greer et al. | 359/276 |
| 2004/0090446 A1* | 5/2004 | Lee et al. | 345/690 |
| 2004/0218251 A1* | 11/2004 | Piehl et al. | 359/290 |
| 2006/0066599 A1* | 3/2006 | Chui | 345/204 |
| 2007/0115480 A1* | 5/2007 | Zhang et al. | 356/503 |
| 2008/0239494 A1* | 10/2008 | Zander | 359/578 |

OTHER PUBLICATIONS

U.S. Appl. No 11/092,635, filed Mar. 30, 2005, Mestha et al.

* cited by examiner

*Primary Examiner*—Amare Mengistu
*Assistant Examiner*—Hong Zhou
(74) *Attorney, Agent, or Firm*—Oliff & Berridge, PLC (57) ABSTRACT

An apparatus may include an illuminator, a controller, a display panel, a modulator, and a plurality of Fabry-Perot cavities. The plurality of Fabry-Perot cavities generated an image from light provided by the illuminator, each pixel of the image corresponding to a respective one of the plurality of Fabry-Perot cavities. The controller controls the modulator to provide image modulation data to the plurality of Fabry-Perot cavities for generating the image, the modulator providing color information to a first cavity of the plurality of Fabry-Perot cavities for setting a size of the first cavity to correspond to a color of a first pixel of the image, the modulator providing gray level information to the first cavity for time-division multiplexing to correspond to a gray level of the first pixel. The display panel display pixels of the generated image based on colors and gray levels of each pixel of the generated image.

25 Claims, 6 Drawing Sheets

SYSTEM AND METHODS OF DEVICE INDEPENDENT DISPLAY USING TUNABLE INDIVIDUALLY-ADDRESSABLE FABRY-PEROT MEMBRANES

Cross-reference is made to co-pending, commonly assigned application, U.S. application Ser. No. 11/092,635, filed Mar. 30, 2005, by Mestha et al., entitled "Two-Dimensional Spectral Cameras and Methods for Capturing Spectral Information Using Two-Dimensional Spectral Cameras," and U.S. Pat. No. 6,295,130 issued Sep. 25, 2001, the entire disclosures of which are herein incorporated by reference.

BACKGROUND

It has been difficult to achieve device-independent colors in high-resolution displays to reproduce wide ranges of rich colors. From cellular phone screens to digital movie theaters, the demand for optical micro-electro-mechanical-system (MEMS) used in display technology is growing. The challenge is still in displaying rich chromatic colors at high resolution and at low power consumption.

SUMMARY

Various exemplary systems and methods provide a low cost two-dimensional matrix display system. The display system may include a Fabry-Perot cavity array and an illuminator. Each cavity may be tuned to transmit colors of color-separated incoming image pixels. For each color-separated image pixel, multiple gray levels may be achieved through time-division multiplexing of the transmitted light. In various exemplary systems and methods, the display system may be a two-dimensional flat panel matrix display system, with each individual pixel of the image having a color corresponding to the size of a respective cavity, with gray levels achieved using the time-division multiplexing of the cavity. The size and time-division multiplexing of the cavities provide a device-independent display of the image with rich chromatic colors.

These and other features and details are described in, or are apparent from, the following detailed description.

BRIEF DESCRIPTION OF THE DRAWINGS

Various exemplary details of systems and methods are described, with reference to the following figures, wherein.

DETAILED DESCRIPTION OF EMBODIMENTS

The basic structure of a Fabry-Perot cavity spectrophotometer is described in detail in U.S. Pat. No. 6,295,130, and co-pending application Ser. No. 11/092,635, which are incorporated herein by reference in their entirety. The basic Fabry-Perot spectrophotometer includes two micro-mirrors separated by a gap. The gap may be an air gap, or may be filled with liquid or other material. The micro-mirrors include multi-layer distributed Bragg reflector (DBR) stacks or highly reflective metallic layers, such as gold. A voltage applied between the two mirrors may be adjusted to change the distance between the two mirrors. The space between the two mirrors is also referred to as the size of the gap. Only incident light with certain wavelength may be able to pass the gap due to interference effect which is created inside the gap due to multiple reflections.

Figure 1:
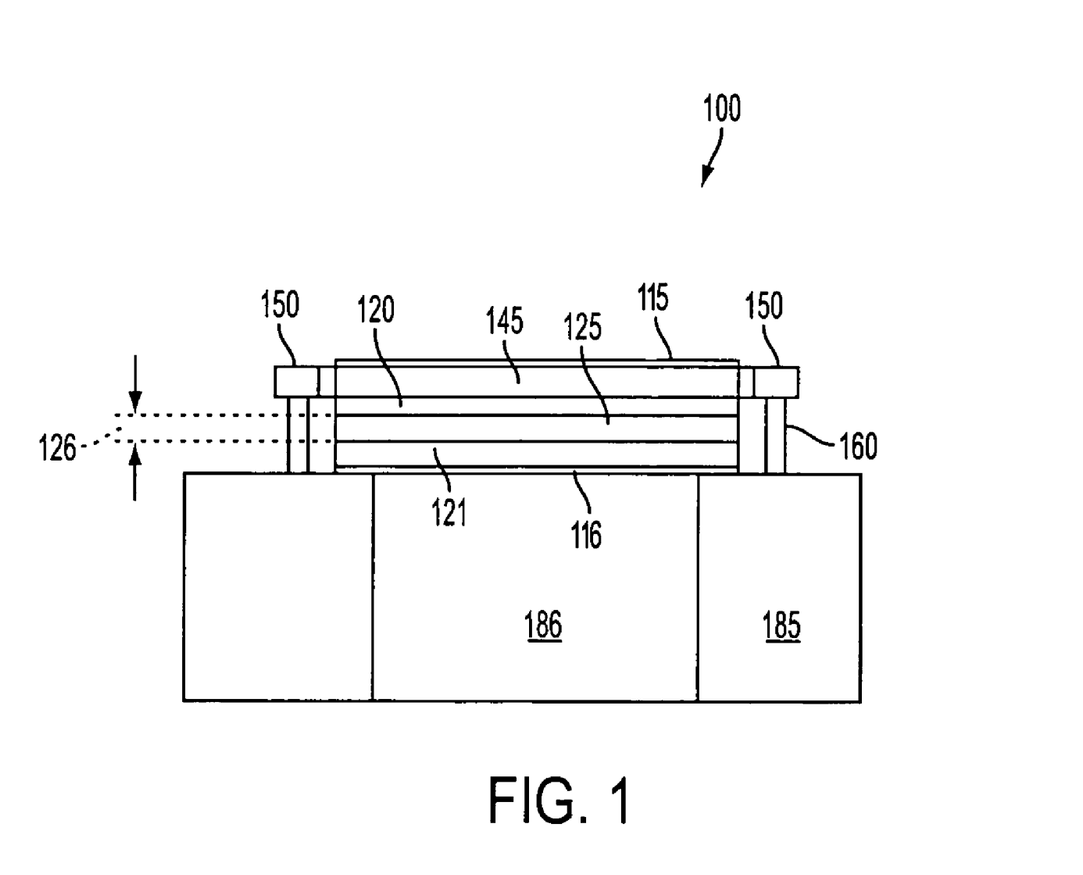
FIG. 1 illustrates a side view of an exemplary Fabry-Perot cavity structure.
Figure 2:
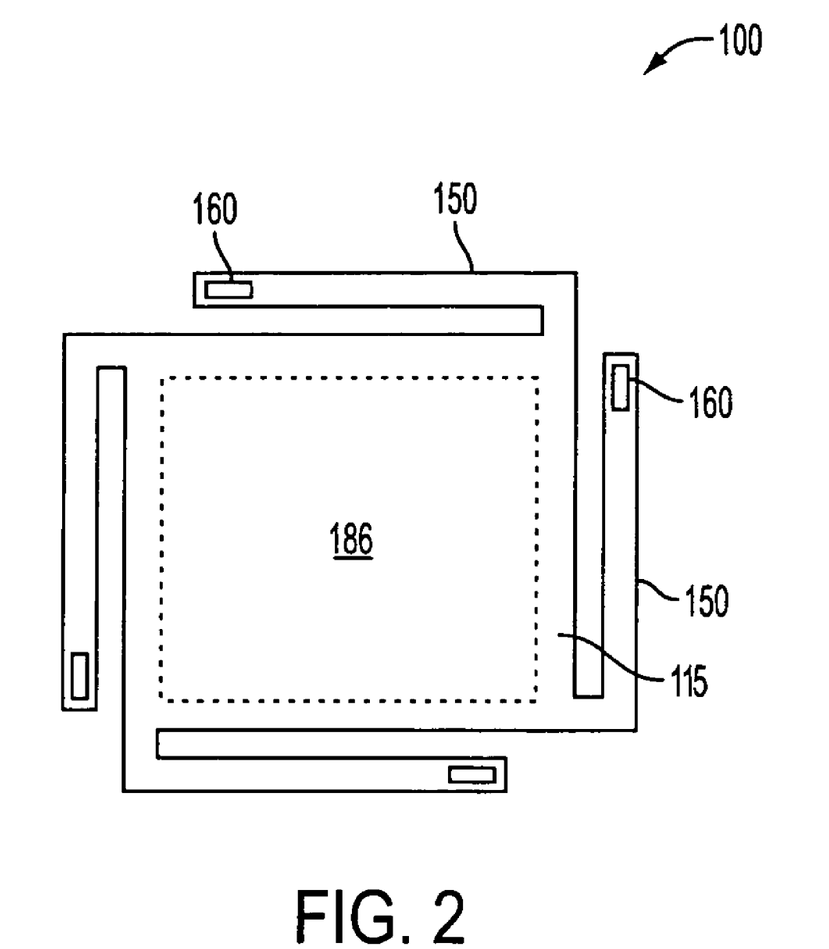
FIG. 2 illustrates a top view of the exemplary Fabry-Perot cavity structure shown in FIG. 1.

For example, FIG. 1 shows a side view of an embodiment of a micro-electro-mechanically tunable spectrophotometer having a Fabry-Perot (F-P) micro-electro-mechanically tunable cavity structure 100. FIG. 2 is a top view of the cavity structure 100. As shown in FIG. 1, the cavity structure 100 may include a top mirror 120 and a bottom mirror 121. In various exemplary embodiments, the bottom mirror 121 may be a bottom distributed Bragg reflector (DBR) mirror that includes three pairs of quarter wavelength $Si/SiN_x$ stacks. The top mirror 120 may be a top distributed Bragg reflector (DBR) mirror that includes two pairs of quarter wavelength $Si/SiN_x$ stacks.

As shown in FIG. 1, the cavity structure 100 may also include a top electrode 115 and a bottom electrode 116. The top electrode 115 may be formed on the top mirror 115 via a support element 145. The bottom electrode 116 may be sandwiched between the bottom mirror 121 and a substrate 185.

The substrate 185 may have a portion 186 that may be a hole or a transparent part. The support element 145 may be a transparent substrate. The top electrode 115 and the bottom electrode 116 may be transparent electrodes. Indium tin oxide (ITO) may be used for the transparent bottom electrode 116 and the transparent top electrode 115.

The top and bottom mirrors 120 and 121 may be separated by a gap cavity 125. The gap cavity 125 may be maintained in a variety of ways. In various exemplary embodiments, the gap cavity 125 may be maintained using a plurality of springs 150. As shown in FIGS. 1 and 2, each of the plurality of springs 150 corresponds to a respective one of a plurality of anchors 160. The plurality of springs 150 are connected to the support element 145 such that the top mirror 120 is kept away from the bottom mirror 121 by the gap cavity 125.

The gap cavity 125 may be characterized by the distance 126 between the top and bottom mirrors 120 and 121. The distance 126 represents a dimension of the gap cavity 125, and may be referred to as a size or height of the gap cavity 125.

The size 126 may be changed or otherwise adjusted. For example, top mirror 120 may be deformed to a dimensional change in the gap cavity 125 by applying a voltage in the range of 5-100 volts across transparent bottom electrode 116 and transparent top electrode 115, or a charge in the range of $10^{-11}$ coulombs on transparent bottom electrode 116 and transparent top electrode 115 to effect a change in the size 126 of gap cavity 125 of about 300 to 500 nm. Hence, electrodes 115 and 116 may form a capacitor and the Fabry-Perot cavity structure 100 may have an associated capacitance. As the size 126 of gap cavity 125 decreases, for example, the Fabry-Perot transmission peak shifts to shorter wavelengths.

The size 126 may be changed in a variety of ways. For example, the size 126 may be changed in a way in which the top mirror 115 stays stationary, while the bottom mirror 116 moves relative to the top mirror 115. Alternatively, the size 126 may be changed in a way in which the bottom mirror 116 stays stationary, while the top mirror 115 moves relative to the bottom mirror 116. Alternatively, the size 126 may be changed in a way in which both the top mirror 115 and the bottom mirror 116 are moving relative to each other. In various exemplary embodiments, the top mirror 115 and the bottom mirror 116 maintain parallel with each other regardless of the relative movement there between.

Furthermore, the size of the gap cavity 125 may be changed by a mechanism other than application of a voltage. For example, the size of gap cavity 125 may be changed by a mechanical, thermal or magnetic mechanism.

In the cavity structure 100 shown in FIG. 1, light may be received at the top of the cavity structure 100 through the top electrode 115. The received light may be transmitted through the gap cavity 125 and the portion 186 of the substrate 185 at a tuned wavelength.

Figure 3:
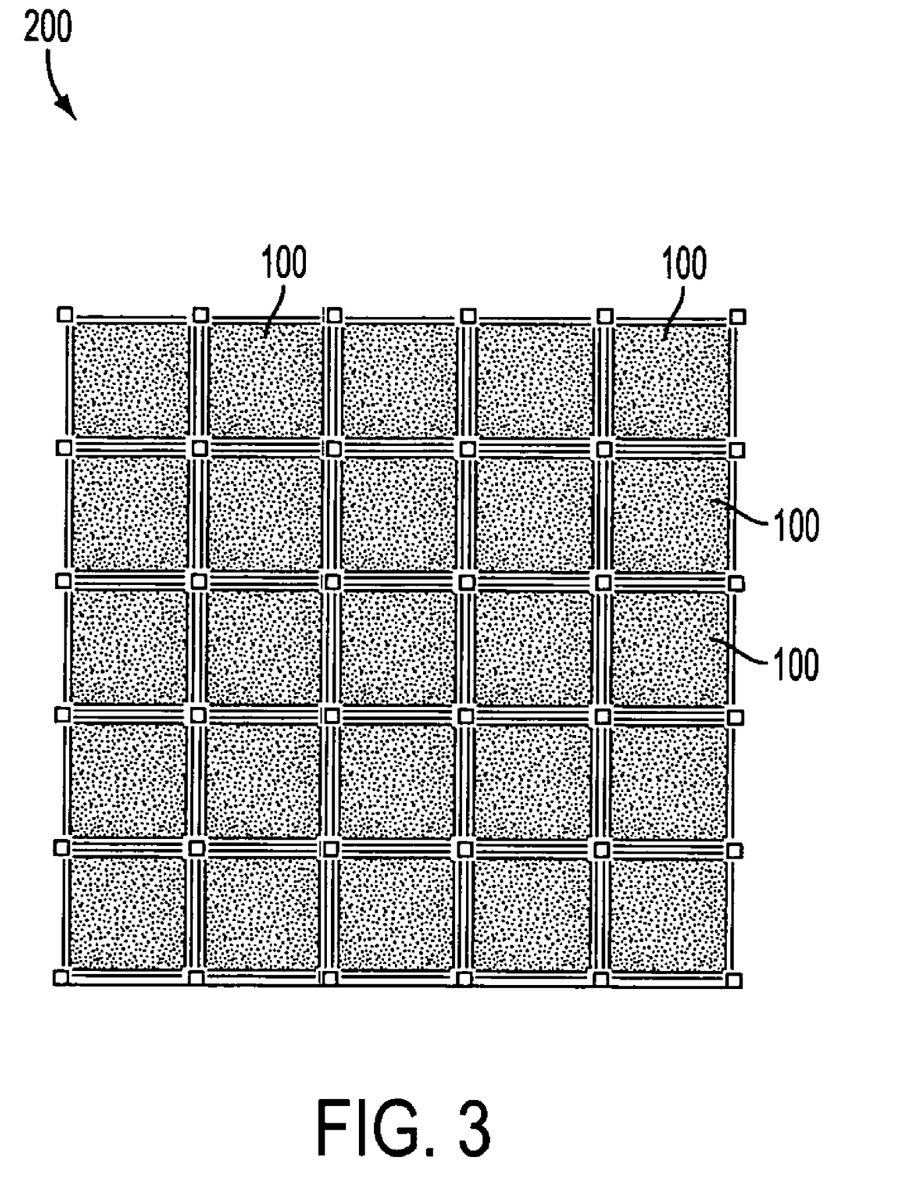
FIG. 3 illustrates an exemplary Fabry-Perot cavity array.

FIG. 3 illustrates an exemplary addressable Fabry-Perot cavity array 200. As shown in FIG. 3, the cavity array 200 may include a plurality of adjacently located Fabry-Perot cavities 100. For clarity, support structures are not shown in the figure. For example, FIG. 3 shows a 5×5 array of cavities. However, in general, other arrays may also be used, such as an N×M array, where N and M are integers. Alternatively, the cavities may also be arranged in other geometrically shapes, such as a triangle, a diamond, a hexagon, a trapezoid, or a parallelogram. Each arrayed and/or shaped cavities form a block of cavities. A plurality of blocks may be used to form a larger display system.

In various exemplary embodiments, the cavities each may include a silicon membrane attached directly to a silicon spring, so that the silicon membrane may move to change the size of the cavity. In various other exemplary embodiments, the cavity may include membranes as parallel plates attached to a silicon frame. The cavities may be located close to each other without much wasted space in between, so that the amount of "dead space" between adjacent membranes may be reduced or even minimized, and the space used for display may be increased or even maximized.

Figure 4:
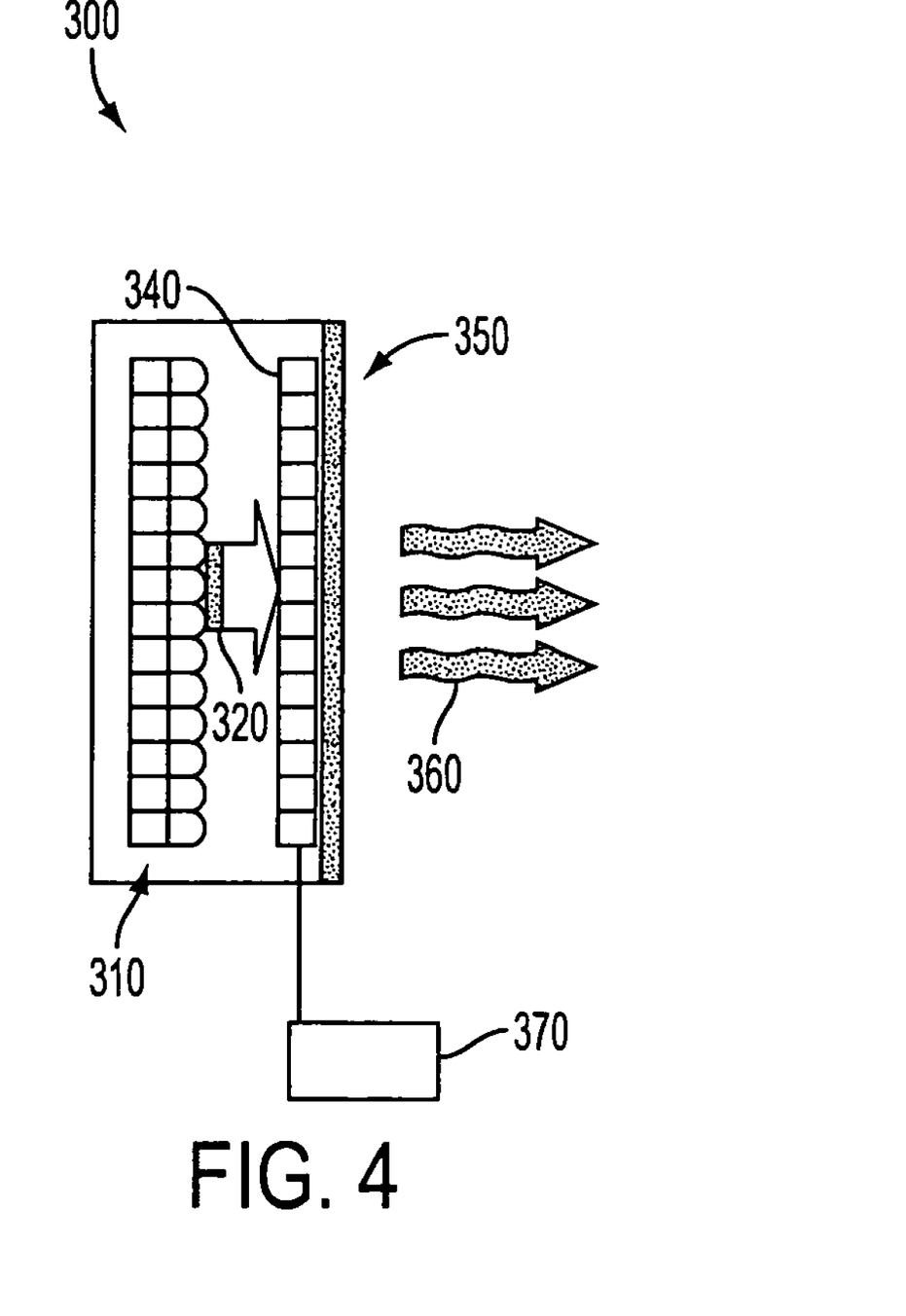
FIG. 4 illustrates an exemplary Fabry-Perot display.

FIG. 4 illustrates an exemplary embodiment of a display spectral panel 300. As shown in FIG. 4, the display panel 300 may include an illuminator 310, a Fabry-Perot cavity array 340, and a display panel, such as a glass panel, 350.

The illuminator 310 may be a white LED illuminator panel. The Fabry-Perot cavity array 340 may be a two-dimensional matrix of small sized MEMS Fabry-Perot tunable filters, such as the display array 200 shown in FIG. 3. The display panel 350 may be used as a front viewing surface.

The Fabry-Perot cavity array 340 may be controlled by a modulator 370. The modulator 370 may by connected to the Fabry-Perot cavity array 340, and may be a gap control circuit that controls the movement of the mirrors in each cavity. Based on image modulation data, each cavity is controlled to have a desired cavity size to allow transmission of a particular or collective wavelength. The particular or particular wavelength corresponds to the color of a respective image pixel.

The cavity may also be controlled to provide multiple gray levels for each color-separated image pixel. The provision of the gray levels may be implemented in a variety of ways. Any method that may generate gray levels for each color-separated image pixel may be used in generating gray levels in the Fabry-Perot cavity array 340.

For example, the cavity may be controlled through time-division multiplexing of the transmitted light to provide multiple gray levels for each color-separated image pixel. A pixel is fully "on" when all pre-selected transmission wavelengths are swept within the bandwidth of the perceptual limit of human eyes. The bandwidth is typically less than 60 milliseconds.

The pixel is fully "off" when no light is transmitted. Transmission that is between these two limits creates gray-scale levels.

As shown in FIG. 4, illuminator 310 provides light 320. The light 320 may be uniformly provided to the Fabry-Perot cavity array 340. The light 320 may be white light. The white light may include light emitting diodes (LED) or fluorescent light tubes covering visible light wavelength range from 400 nm to 700 nm.

As shown in FIG. 4, light 320 passes through the Fabry-Perot cavity array 340. Modulated light 360 is produced by the Fabry-Perot cavity array and is displayed at the glass panel 350 for viewing.

The modulated light may include an image. Each pixel of the modulated image corresponds to a cavity in the cavity array. The color of the pixel is controlled by the size of the cavity. The brightness of the pixel is controlled by time-division multiplexing of the cavity. Thus, an array of cavities corresponds to an array of pixels, and thus corresponds to an image having the array of pixels.

The modulated image may be one of a series of images modulated from the white light to pass through the cavity array 340. The series of images may be animated, such as in a video clip or a movie. The series of images may also represent stationary images, such as a viewgraph or a page of textual content.

In particular, when the light 310 passes through the cavity array 340, enough color sweeps may be obtained from the cavity array in a spectral space that cover a range of colors required for the pixels by corresponding adjustment of the Fabry-Perot cavity size using modulating data from the modulator 370. The color sweeps may be carried out at a high frequency, such as 60 Hz or greater, so that human eyes cannot distinguish between filtered color coming out of the discrete gap setting. Thus, the display panel 300 may display color images in various wavelengths by transmitting selectively very narrow wavelengths or collectively a group of wavelengths for each image pixel.

In FIG. 4, the Fabry-Perot cavity array may include a two-dimensional array of thin membranes and may be a matrix addressable as a group, or independently, depending on the need. In the matrix addressable as a group, more than one Fabry-Perot cavity will be actuated together to transmit same wavelengths. Addressing a group or single cavity independently allows different wavelengths to pass through the filter at the same time. The actuation of the addressing may be performed by the modulator 370 by modulating the voltage signals provided to drive the cavities.

The illuminator 310 may be a regular LED illuminator, a high density LED illuminator, quantum dots or the like. New generation of smart light sources whose properties are fully controllable and tunable in terms of their spectral, polarization, color temperature and intensity are likely to show up in the market in a few years. Such new light sources may also be used as illuminator 310.

The thickness of the display panel 300 may depend on the illuminator 310 used in display panel 300. The display panel 300 may be made flat within a couple of millimeters in thickness. Alternatively, the display panel 300 may also be made thick if projection illuminators with lamp and lens systems are used. The illuminator 310 may also be white-light quantum dots, which produce a smoother distribution of wavelengths in the visible spectrum with a slightly warmer, slightly more yellow tint. The quantum dots, like white LEDs, have the advantage of not giving off large amounts of invisible infrared radiation unlike the light bulb. This invisible radiation produces large amounts of heat and largely accounts for the light bulb's low energy efficiency.

As discussed above, time-division multiplexing may be used to control different brightness (gray) levels of a pixel. To limit the amount of light transmitting through a pixel, unwanted light may be moved into a non-visible part of the spectrum, such as ultraviolet or infrared. Alternatively, unwanted light may be completely blocked by properly adjusting the size of the cavity.

For example, to display a wavelength of light at half brightness, the membrane may spend half of its time set to the gap (size of the cavity) for that wavelength, and the other half at a gap that does not have constructive interference anywhere in the visible spectrum.

In time-division multiplexing, the time resolution of a driving circuitry, such as the modulator 370 or a circuitry used in connection with the modulator 370, sets a limit to the number of gray levels possible for a wavelength. For example, if T is the time limit of human eyes perceptual time bandwidth to response to changes in color and "i" is representing the tunable discrete peak wavelengths for the transmission spectra available in the Fabry-Perot tunable filter, then, for a transmission mode display, the gray levels may be represented by the following integral equation:

$$g_i(t) = \frac{\int_0^t \int_{\lambda_{min}}^{\lambda_{max}} S_i(\lambda) d\lambda dt}{g_{i\_100}} \quad (1)$$

In Equation (1), $S_i(\lambda)$ represents the transmission spectra of the Fabry-Perot filter for a discrete peak wavelength setting represented by index 'I', and $\lambda_{min}$ and $\lambda_{max}$ are minimum and maximum wavelengths in the visible range of the light spectra or any suitable range required for integrating the transmission wavelengths. Also, $g_{i\_100}$ represents the maximum gray level for channel index 'i' used to normalize the gray level $g_i(t)$. When there are N number of gray levels required for the display (N is typically 256 for a display system) and under time division multiplexing, the total time over which the channel 'i' is left "on" satisfies the following condition:

$$T \leq \sum_{i=1}^{N} T_i \quad (2)$$

Modified versions of Equations (1) and (2) may be used to create multiple gray levels for transmission-type displays. The gray levels for M number of channels may be expressed as:

$$g_i(j) = T_j V_i \text{ for } i=1,2,3,\ldots, M \text{ and } j=1,2,\ldots, N \quad (3)$$

where $V_i$ may obtained, based on Equation (1), from:

$$V_i = \frac{\int_{\lambda_{min}}^{\lambda_{max}} S_i(\lambda) d\lambda}{g_{i\_100}} \quad (4)$$

Equations (3) and (4) provide gray levels for the MEMS display.

It is noted that the time-division multiplexing is one of a variety of ways for providing gray levels. As discussed above, any method that may generate gray levels for each color-separated image pixel may be used in generating gray levels in the Fabry-Perot cavity array 340.

Figure 5:
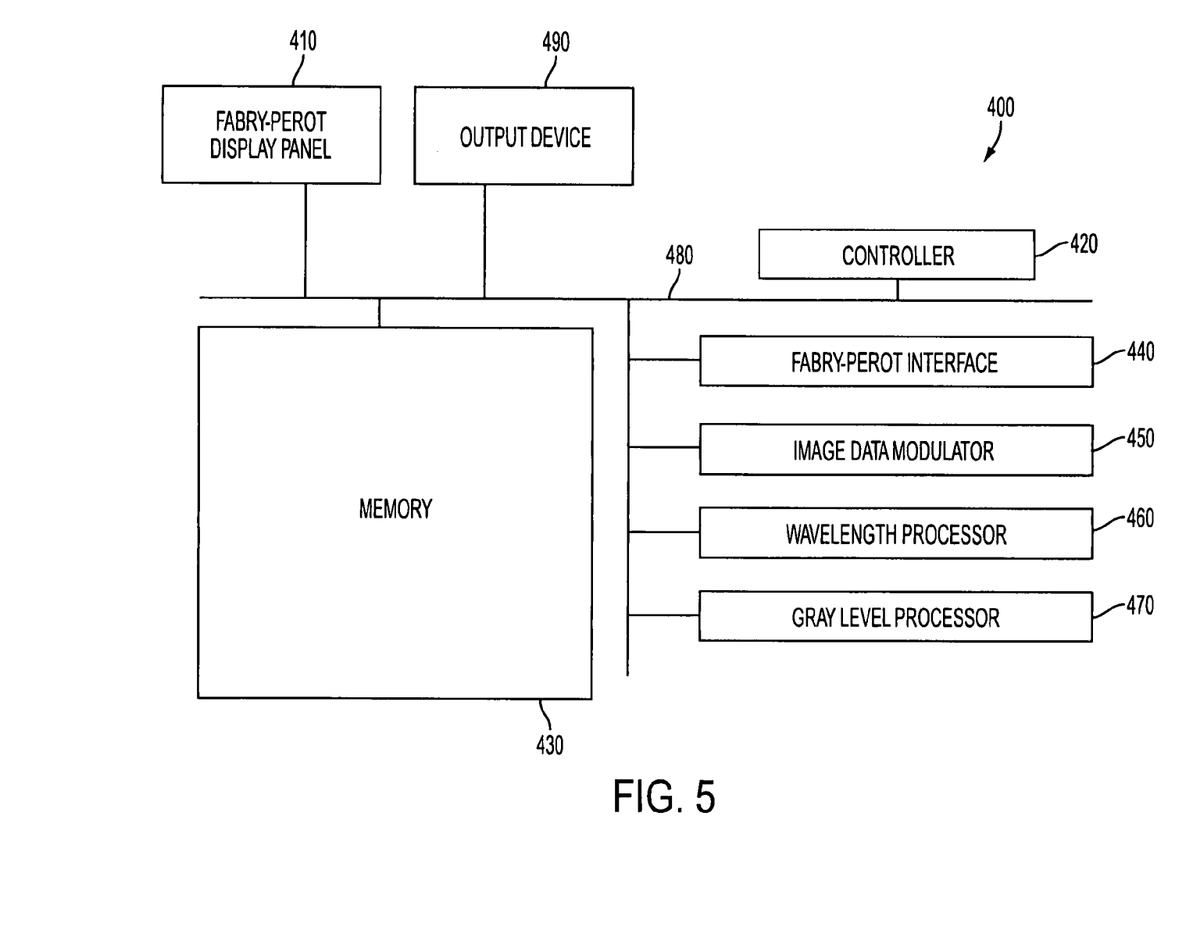
FIG. 5 is a block diagram illustrating an exemplary spectral display system.

FIG. 5 is a block diagram illustrating an exemplary spectral display system. As shown in FIG. 5, the spectra display system 400 may include a Fabry-Perot display panel 410, a controller 420, a Fabry-Perot interface 440, an image data modulator 450, a wavelength processor 460, a gray level processor 470, a memory 430, and an output device 490, each connected by a connection or data bus 480.

In FIG. 5, the Fabry-Perot display panel 410 may be a spectral display panel, such as the display spectral panel 300 illustrated in FIG. 4. The image data modulator 450 may be a modulator, such as the modulator 370 illustrated in FIG. 4, that provides image modulation data.

The various components shown in FIG. 5 perform their respective functions under control of the controller 420.

In operation, the Fabry-Perot display panel 410 generates modulated images from light provided by an illuminator, such as the illuminator 310 illustrated in FIG. 4. The image data modulator 450 communicates with the Fabry-Perot display panel 410 via Fabry-Perot interface 440. The image data modulator 450 provides modulation data for generating an image. The wavelength processor 460 provides control signal to control the size of a cavity at a particular time. The gray level processor 470 provides control signal to control the time-division multiplexing of a cavity. The generated modulated image may be stored in memory 430, or may be output from output device 490. The generated modulated image may also be displayed at Fabry-Perot display panel 410.

Figure 6:
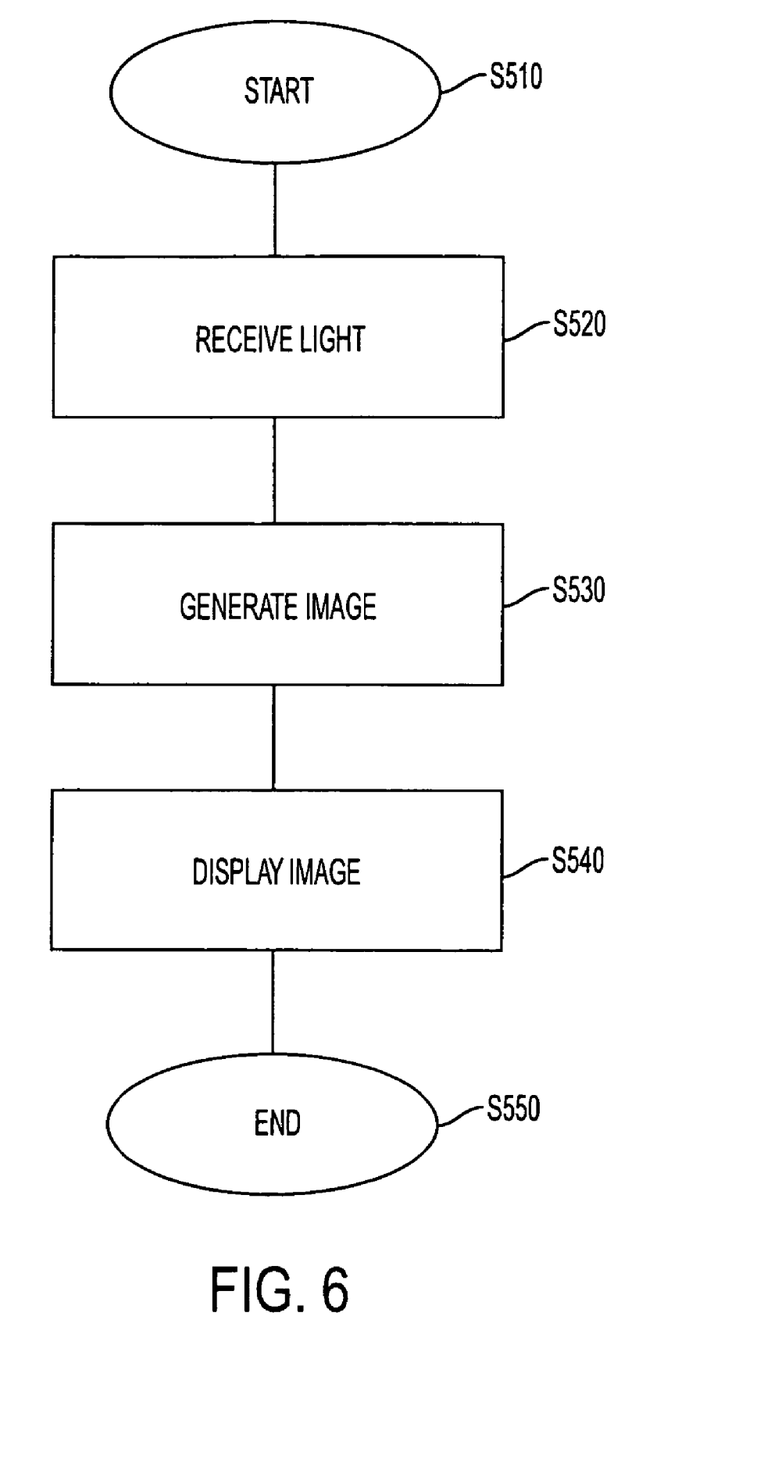
FIG. 6 outlines an exemplary process for generating a spectral display.

FIG. 6 outlines an exemplary process for controlling a display panel. As shown in FIG. 6, the process starts at step S510 and proceeds to step S520, where light from an illuminator is received at the display panel. Next, at step S530, a cavity array of the display panel is controlled by wavelength information and gray level information to generate an array of respective pixels of an image based on modulation data.

Then, in step S540, the generated image is displayed at the display panel, output through an output device, or stored in a storage. Thereafter, the process 500 proceeds to step S550, where the process ends. It is understood that one or more of the steps in FIG. 6 may be omitted.

The method illustrated in FIG. 6 may be implemented in a computer program product that may be executed on a computer. The computer program product may be a computer-readable recording medium on which a control program is recorded, or may be a transmittable carrier wave in which the control program is embodied as a data signal.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An apparatus, comprising:
    a display panel with a plurality of Fabry-Perot cavities;
    an illuminator that provides light to the plurality of Fabry-Perot cavities; and
    a modulator that is connected to the plurality of Fabry-Perot cavities, the modulator being controlled by a controller to provide modulation signals to the plurality of Fabry-Perot cavities,
    wherein:
        the plurality of Fabry-Perot cavities generates an image from light provided by the illuminator, each pixel of the image corresponding to a respective one of the plurality of Fabry-Perot cavities,
        the controller controls the modulator to provide image modulation data to the plurality of Fabry-Perot cavities for generating the image, the modulator providing color information to a first cavity of the plurality of Fabry-Perot cavities for setting a size of the first cavity to correspond to a color of a first pixel of the image, the modulator providing gray level information to the first cavity for generating a gray level of the first pixel based on a transmission spectra of the first cavity,
        the display panel display pixels of the generated image based on colors and gray levels of each pixel of the generated image, and
        the gray level is represented by:

$$\frac{\int_0^t \int_{\lambda_{min}}^{\lambda_{max}} S_i(\lambda)\,d\lambda\,dt}{g_{i\_100}}$$

where $S_i(\lambda)$ represents the transmission spectra of the first cavity for a discrete peak wavelength setting represented by index 'i,' $\lambda_{min}$ and $\lambda_{max}$ are minimum and maximum wavelengths in visible range of light spectra, $g_{i\_100}$ represents maximum gray level for channel index 'i' used to normalize the gray level, N number of gray levels are required for the display panel and total time over which channel 'i' is on satisfies the following condition:

$$T \leq \sum_{i=1}^{N} T_i.$$

2. The apparatus according to claim 1, wherein the illuminator comprises a liquid crystal device (LCD) panel.

3. The apparatus according to claim 1, wherein each of the Fabry-Perot cavities comprises a pair of membranes, and the controller adjusts a distance between the pair of membranes based on the image modulation data.

4. The apparatus according to claim 1, wherein the plurality of Fabry-Perot cavities comprises a plurality of groups of adjacent Fabry-Perot cavities.

5. The apparatus according to claim 4, wherein each of the groups comprises an N×M array of Fabry-Perot cavities, where N and M are integers.

6. The apparatus according to claim 4, wherein:
a first group comprises an N1×M1 array of Fabry-Perot cavities, where N1 and M1 are integers, and
a second group comprises an N2×M2 array of Fabry-Perot cavities, where N2 and M2 are integers, N2 and M2 being different from N1 and M1, respectively.

7. The apparatus according to claim 4, wherein the cavities in each of the groups are arranged in a substantially triangle, diamond, hexagon, trapezoid, or parallelogram configuration.

8. The apparatus according to claim 1, wherein each of the Fabry-Perot cavities comprises a pair of mirrors and the controller adjusts a distance between the pair of mirrors based on the image modulation data.

9. The apparatus according to claim 1, wherein the modulator providing gray level information to the first cavity for time-division multiplexing to correspond to a gray level of the first pixel.

10. The apparatus according to claim 9, wherein the controller controls the time division multiplexing at a frequency equal to or greater than 60 Hz.

11. The apparatus according to claim 9, wherein the controller controls the size and time division multiplexing of each cavity individually, based on image modulation data of each respective individual pixel of the image.

12. The apparatus according to claim 1, wherein the illuminator comprises a white light source that includes light emitting diodes (LED) or fluorescent light tubes covering visible light wavelength range from 400 nm to 700 nm.

13. A method of generating an image using an apparatus, the apparatus comprising a display panel with a plurality of Fabry-Perot cavities, an illuminator that provides light to the plurality of Fabry-Perot cavities, and a modulator that is connected to the plurality of Fabry-Perot cavities, the modulator being controlled by a controller to provide modulation signals to the plurality of Fabry-Perot cavities, the method comprising:

generating an image, using the plurality of Fabry-Perot cavities, from light provided by the illuminator, each pixel of the image corresponding to a respective one of the plurality of Fabry-Perot cavities;

providing image modulation data, using the controller, from the modulator to the plurality of Fabry-Perot cavities for generating the image, the modulator providing color information to a first cavity of the plurality of Fabry-Perot cavities for setting a size of the first cavity to correspond to a color of a first pixel of the image, the modulator providing gray level information to the first cavity for generating a gray level of the first pixel based on a transmission spectra of the first cavity, and displaying the generated image at the display panel, the generated image including pixels generated based on colors and gray levels indicated in the image modulation data for each pixel, wherein the gray level is represented by:

$$\frac{\int_0^t \int_{\lambda_{min}}^{\lambda_{max}} S_i(\lambda)\,d\lambda\,dt}{g_{i\_100}}$$

where $S_i(\lambda)$ represents the transmission spectra of the first cavity for a discrete peak wavelength setting represented by index 'i,' $\lambda_{min}$ and $\lambda_{max}$ are minimum and maximum wavelengths in visible range of light spectra, $g_{i\_100}$ represents maximum gray level for channel index 'i' used to normalize the gray level, N number of gray levels are required for the display panel and total time over which channel 'i' is on satisfies the following condition:

$$T \leq \sum_{i=1}^{N} T_i.$$

14. The method of claim 13, wherein the illuminator comprises a liquid crystal device (LCD) panel.

15. The method of claim 13, wherein each of the Fabry-Perot cavities comprises a pair of membranes, the method further comprising:
adjusting a distance between the pair of membranes based on the image modulation data.

16. The method of claim 13, wherein the plurality of Fabry-Perot cavities comprises a plurality of groups of adjacent Fabry-Perot cavities.

17. The method of claim 16, wherein each of the groups comprises an N×M array of Fabry-Perot cavities, where N and M are integers.

18. The method of claim 13, wherein:
a first group comprises an N1×M1 array of Fabry-Perot cavities, where N1 and M1 are integers, and
a second group comprises an N2×M2 array of Fabry-Perot cavities, where N2 and M2 are integers, N2 and M2 being different from N1 and M1, respectively.

19. The method of claim 16, wherein the cavities in each of the groups are arranged in a substantially triangle, diamond, hexagon, trapezoid, or parallelogram configuration.

20. The method of claim 13, wherein each of the Fabry-Perot cavities comprises a pair of mirrors, the method further comprising:

adjusting a distance between the pair of mirrors based on the image modulation data.

21. The method of claim 13, wherein the modulator providing gray level information to the first cavity for time-division multiplexing to correspond to a gray level of the first pixel.

22. The method of claim 21, further comprising:

controlling the time division multiplexing at a frequency equal to or greater than 60 Hz.

23. The method of claim 21, further comprising:

controlling the size and time division multiplexing of each cavity individually, based on image modulation data of each respective individual pixel of the image.

24. The apparatus according to claim 13, wherein the illuminator comprises a white light source that includes light emitting diodes (LED) or fluorescent light tubes covering visible light wavelength range from 400 nm to 700 nm.

25. A computer program product including computer-executable instructions stored on a computer-readable medium, wherein the computer program when executed performs the method recited in claim 13.

* * * * *